(12) United States Patent
Schneider et al.

(10) Patent No.: US 7,826,539 B2
(45) Date of Patent: Nov. 2, 2010

(54) ASYNCHRONOUS SERIAL DATA INTERFACE

(75) Inventors: Gregor Schneider, Bochum (DE); Daniel Bencak, Dortmund (DE)

(73) Assignee: Nokia Corporation, Espoo (FI)

( * ) Notice: Subject to any disclaimer, the term of this patent is extended or adjusted under 35 U.S.C. 154(b) by 1422 days.

(21) Appl. No.: 10/495,348

(22) PCT Filed: Feb. 25, 2002

(86) PCT No.: PCT/IB02/00573

§ 371 (c)(1),
(2), (4) Date: Sep. 10, 2004

(87) PCT Pub. No.: WO03/050693

PCT Pub. Date: Jun. 19, 2003

(65) Prior Publication Data

US 2005/0021307 A1    Jan. 27, 2005

(30) Foreign Application Priority Data

Dec. 11, 2001  (GB) ............................ 0129614.4

(51) Int. Cl.
*H04L 27/00* (2006.01)
(52) U.S. Cl. .......................... 375/259; 375/377
(58) Field of Classification Search .......... 375/259, 375/377; 370/257, 219, 254, 229–240, 412–420; 710/71; 705/52
See application file for complete search history.

(56) References Cited

U.S. PATENT DOCUMENTS 5,140,679 A * 8/1992 Michael .............. 710/106
5,619,544 A * 4/1997 Lewis et al. ........... 375/377
6,046,995 A * 4/2000 Turnbull et al. ......... 370/389

(Continued)

FOREIGN PATENT DOCUMENTS

CN    1233132    10/1999

(Continued)

OTHER PUBLICATIONS

Schürmann, B., "Rechnerverbindungsstrukturen", Chapter 1.2: Grundlagen der Datenübertagung; Vieweg Lehrbuch; 1997, pp. 64-97. (Partial translation at pp. 73-76).

(Continued)

*Primary Examiner*—Sam K Ahn
*Assistant Examiner*—Sonia J King
(74) *Attorney, Agent, or Firm*—Harrington & Smith

(57) ABSTRACT

A receiver for receiving packet data from a transmitter, the transmitter and the method of controlling transmission. The receiver may comprise first detection means for detecting that its memory has enough space to store a data packet and flow control signal means for providing a flow control signal, preferably a first flow control signal, to the transmitter in response to said first detection means. The receiver may comprise second detection means for detecting when a first portion of a packet has been received from the transmitter and flow control signal means for providing a second flow control signal to the transmitter in response to said second detection means. The transmitter may comprise third detection means for detecting the second flow control signal sent by the receiver and packetwise transmission means arranged, responsive to the third detection means, to complete transmission of a partially transmitted packet and then to stop transmission of further packets.

11 Claims, 2 Drawing Sheets

U.S. PATENT DOCUMENTS

| | | | | |
|---|---|---|---|---|
| 6,445,718 | B1* | 9/2002 | Muto | 370/474 |
| 6,859,435 | B1* | 2/2005 | Lee et al. | 370/231 |
| 7,190,667 | B2* | 3/2007 | Susnow et al. | 370/229 |

FOREIGN PATENT DOCUMENTS

| | | |
|---|---|---|
| CN | 1307776 | 12/1999 |
| EP | 0632391 A2 | 9/1989 |
| EP | 0685797 A1 | 6/1994 |
| EP | 1134665 A2 | 9/2001 |
| JP | 11-17743 | 1/1999 |

OTHER PUBLICATIONS

H3 RS232, "Specification of the Bluetooth System", Wireless Connections Made Easy, Specification V1.0 B, Nov. 29, 1999, pp. 1-14, Title and Table of Contents; pp. 780-783, Negotiation Protocol, "Tdetect time"; pp. 1074-1082, List of Figures, Tables, References and Index.

* cited by examiner

ASYNCHRONOUS SERIAL DATA INTERFACE

FIELD OF THE INVENTION

This invention relates to a serial communication system with data flow on a cable, e.g. a Universal Asynchronous Receiver/Transmitter (UART). The data is packet data.

BACKGROUND OF THE INVENTION

A UART has a data connector connecting a transmitter to a receiver. The data sent from the transmitter to the receiver may be packet data. A packet is made up of multiple bytes of data. When the transmitter is sending packets asynchronously to the receiver it is important for the receiver to know where one packet ends and the next packet begins.

It is known for the receiver to count received bits/bytes from the start of communication. The first data bytes the receiver receives then must be the start of a packet. The receiver knows length information about the packet, and from this information the receiver can calculate when the end of the packet is received. Consequently, the next bytes it receives must be the start of the next packet. Thus the transmitter and receiver remain synchronised at the packet level.

Now, if an unknown number of bytes is lost because they don't fit in the receive buffer any more ("buffer overflow") the receiver loses packet synchronisation, i.e. the knowledge about when the next packet begins. In order to prevent buffer overflow in the receiver a flow control mechanism is needed.

A UART has a data connector connecting a Transmitter to a Receiver and a control connector connecting the transmitter and receiver. Data in bit serial format is transported from the transmitter to the receiver via the data connector. The control connector carries a control signal RTS/CTS which implements flow control from receiver to transmitter by indicating "flow on" (RTS/CTS active) or "flow off" (RTS/CTS inactive). Flow control prevents too much data being sent by the transmitter and causing overflow of the receiver buffer memory.

There is an instance in the transmitter that controls transmission and should stop transmission after the last bit of the current byte if 'flow off' is indicated. This gives such strict timing requirements, that only a hardware instance can control RTS/CTS fast enough. The hardware can react immediately to the RTS/CTS signal (internal delays are only a fraction of the length of a single bit). If this instance is handled by a microprocessor (software flow control) which at some time, i.e. with some delay, discovers that the RTS/CTS is set to 'flow off' and then has to stop the UART from continuing transmission the delay may be in the range of multiple bytes, and in the worst case the exact delay is not predictable.

For hardware controlled RTS/CTS, when RTS/CTS is active, the transmitter sends data as a continuous data stream. It continuously sends data (byte after byte) while RTS/CTS remains active. When RTS/CTS goes inactive indicating "flow off", the transmitter stops sending data. However, the transmitter does not stop sending data immediately, it continues to transmit until the end of the current byte. The receive buffer in the receiver is byte wise implemented. The receiver sets RTS/CTS inactive at a certain buffer level. Usually when the last byte is being written. It is, however, possible for the Transmitter to negotiate a longer time in order to react to a 'flow off' indication. (E.g. the H3 RS232 protocol in the Bluetooth specification VI.OB, 29 Nov. 1999). Here the transmitter tells the receiver that it has a latency of e.g. 100 µs. The receiver now has to set 'flow off' so early that it can still receive and store the amount of data that the transmitter will send during the next 100 µs. Therefore, it may set the 'flow off' indication RTS/CTS inactive when there is space in the receive buffer remaining for only a certain number of bytes e.g. 10 bytes.

Hardware flow control allows 100% prevention of a buffer overflow by signalling "flow off" within a predefined time. In this way packets aren't lost. A difficult situation arises when there is no hardware support for flow control. Bytes can get lost if the software in the receiver and the transmitter does not react fast enough to prevent buffer overflow. In this case packet synchronisation on the interface is lost.

To overcome the problem of loss of synchronisation when software flow control is used, a "packet delimiting" mechanism has been used. Packets are preceded/followed by a certain pattern as a packet delimiter. However, there are certain problems because the same delimiting pattern may occur within the packet that shall be transmitted. This problem has been solved for example, by the SLIP software protocol in which any occurrence of the delimiter in the data stream have to be replaced by "Escape sequences". However, the software implementation of such a protocol is computationally intensive.

Therefore when there is no hardware support for flow control, bytes can get lost if the software does not react fast enough to prevent buffer overflow and either a complex and computationally intensive software protocol is used to delimit the packets or packet synchronisation on the interface is lost.

It would be desirable to provide an alternative flow control mechanism which provides packet synchronisation.

It would be desirable to provide the mechanism in software with a very low processing cost.

It would be desirable to provide the mechanism without altering the content or size of the packets.

SUMMARY OF THE INVENTION

According to a first aspect of the present invention there is provided a receiver, for receiving packet data from a transmitter, comprising: an output for issuing flow control signals to the transmitter; an input for receiving data from the transmitter; a memory for storing data received from the transmitter; first detection means for detecting that the memory has enough space to store a data packet; and flow control signal means for providing a flow control signal on the output in response to said first detection means.

The flow control means may provide a first flow control signal, enabling the transmitter to transmit the next data packet, in response to the first detection means.

The receiver may additionally comprise second detection means for detecting when a first portion of a packet has been received, wherein the flow control signal means provides a second flow control signal in dependence upon the second detection means. The second flow control signal stops the transmission by the transmitter of the next data packet. The first position may be predetermined and it may be at the end of the packet header, the end of the packet, or elsewhere in the packet.

According to this aspect of the present invention there is provided a method of controlling packet data transmission from a transmitter to a receiver comprising the steps of: detecting in the receiver if the receiver has enough available memory to receive a data packet; and allowing transmission of a data packet from the transmitter to the receiver if there is enough available memory and preventing transmission of a data packet from the transmitter to the receiver if there is not enough available memory.

According to another aspect of the present invention there is provided a receiver, for receiving packet data from a transmitter, comprising: an output for issuing flow control signals to the transmitter; an input for receiving data from the transmitter; a memory for storing data received from the transmitter; second detection means for detecting when a first portion of a packet has been received; and flow control signal means for providing a flow control signal on the output in response to said second detection means.

The first position may be predetermined and it may be at the end of the packet header, the end of the packet, or elsewhere in the packet.

The flow control means provides a second flow control signal, stopping the transmitter from transmitting the next data packet, in response to the second detection means.

The receiver may additionally comprise: first detection means for detecting that the memory has enough space to store the next packet to be received, wherein the flow control signal means provides a first flow control signal in dependence upon the first detection means. The first flow control signal enables the transmitter to transmit the next packet.

According to this aspect of the present invention there is provided a method of controlling packet data transmission from a transmitter to a receiver by sending flow control signals from the receiver to the transmitter, comprising the steps of: sending a flow control signal for disabling further transmission of data packets, while a current packet is being received and in time to allow the transmitter software to respond thereto and to stop transmission before the beginning of the next packet is transmitted.

The flow control signal is preferably a voltage transition. The first and second signals are preferably complimentary signals. The first flow control signal preferably corresponds to a positive transition in RTS/CTS. The second flow control signal preferably corresponds to a negative transition in RTS/CTS.

The packet may comprise a header and a payload. It may be of variable size. The header preferably identifies the packet size to the receiver. The receiver may have means for determining the start of a packet and means for counting the bits/bytes received from the start of a packet. The receiver may have means for reading the packet length of the current packet from a received header.

According to the preferred embodiment, the first detection means may detect that the memory has enough space to store the next packet to be received, for each packet. The receiver may have means for reserving sufficient memory for the maximum packet size N. A success in the reservation indicates that there is enough space to store the next packet. The flow control means may provide a first flow control signal, enabling the transmitter to transmit only the next data packet, in response to the detection means. The receiver asserts the first flow control signal once per packet. The receiver may assert the second flow control signal independently of the status of the memory and once per packet.

According to another embodiment, the flow control means may provide a first flow control signal, in response to said first detection means, enabling the transmitter to restart transmitting data. The flow control means may provide a second flow control signal, in dependence upon said first detection means, disabling the transmitter from transmitting data.

According to a still further aspect of the present invention, there is provided a transmitter, for transmitting packet data to a receiver, comprising: an input for receiving flow control signals from a receiver; an output for transmitting packet data to the receiver; third detection means for detecting a flow control signal at the input; and transmission means arranged, responsive to the third detection means, to complete transmission of a partially transmitted packet and then to stop transmission of further packets.

Thus the transmitter in response to a second flow control signal (RTS/CTS from active to inactive) completes transmission of the current packet.

According to this aspect of the invention, there is provided a method of controlling packet data transmission from a transmitter to a receiver comprising the steps of: sending a first flow control signal from the receiver to the transmitter for stopping the transmission of data from the transmitter to the receiver; receiving the first flow control signal at the transmitter, but completing the transmission of a partially transmitted data packet; and then stopping transmission of data packets until a first flow control signal is sent from the receiver to the transmitter.

Compared to the hardware protocol the invention prevents the hardware overhead. A significant advantage of embodiments of the present invention is that they can still be implemented when the hardware is fixed and cannot be changed.

A current mobile phone may use an integrated circuit without hardware flow control on its I/O interface. As the integrated circuit is already being produced it is no longer possible to change the circuit and add hardware flow control. It would be particularly advantageous to be able to add a module to an existing mobile phone to enhance the phone's functions. One such module could be a Bluetooth transceiver. For such a module, it is imperative that packets of data can be transferred between module and phone without loosing packet synchronisation. Such transfer can be provided according to the present invention.

A "general purpose IO (input/output)" of the phone can be set by software (when being an output) or cause an interrupt on a level change (when being an input). One IO may be used for RTS/CTS of reception, and one IO may be used for RTS/CTS of transmission.

Embodiments of the invention therefore also particularly relate to computer program products which may be added to a device to program the general purpose I/O and allow it to function as a transmitter and/or a receiver according to the invention.

According to a further aspect of the present invention there is provided a computer program product which provides in a receiver having an input for receiving data, a memory for storing data and an output first detection means for detecting that the memory has enough space to store a data packet and flow control signal means for providing a flow control signal at the output in response to the first detection means.

According to another aspect of the present invention there is provided a computer program product which provides in a receiver having an input for receiving data, a memory for storing data and an output: second detection means for detecting when a first portion of a packet has been received; and flow control signal means for providing a flow control signal at the output in response to the second detection means.

According to a still further aspect of the present invention, there is provided a computer program product which provides in a transmitter having an output for transmitting data and an input: third detection means for detecting a flow control signal at the input and transmission means arranged, responsive to the third detection means, to complete transmissions of a partially transmitted packet and then to stop transmission of further packets.

Compared to the software protocol with "Escape Sequences" the invention reduces the processor usage considerably which would otherwise be used to handle the protocol. It also prevents increasing the packet size and therefore makes buffer usage more predictable.

If the packets communicated are of variable length, then the receiver must be told what the length of a particular packet is to maintain packet synchronisation. This is preferably done by having packet length information in the packet header. The receiver gains the packet length information once it has received the first packet bytes containing the length information. However, if there is bit failure on the cable between the receiver and transmitter, the receiver might get corrupted packet length information. The Receiver will therefore assume an incorrect number of bytes in the packet. This is another origin of packet synchronisation loss. The preferred embodiment of the present invention additionally addresses this problem.

BRIEF DESCRIPTION OF THE DRAWINGS

For a better understanding of the present invention and to further understand how the same may be brought into effect, reference will now be made by way of example only to the accompanying drawings in which.

DETAILED DESCRIPTION OF THE INVENTION

Figure 1:
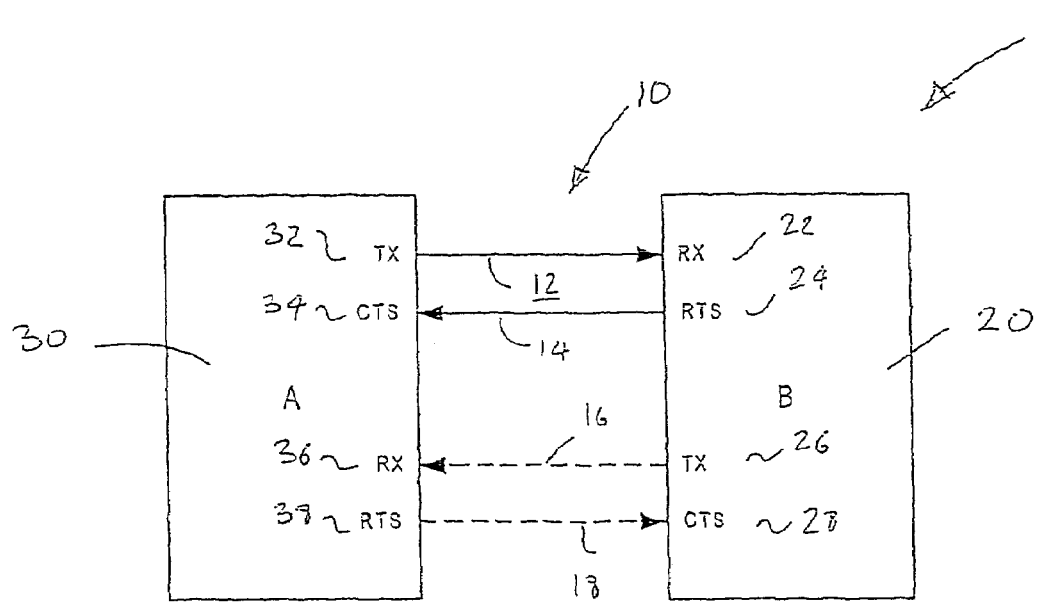
FIG. 1 shows a system with a serial communication interface.

FIG. 1 illustrates a serial communication system 1 with packet data flow on a single cable, possibly in each direction.

The system 1 has a Transmitter 30 and a Receiver 20 interconnected via interface 10. The interface has a data connector 12 connecting pin 32 of the transmitter to pin 22 of the receiver and has a control connector 14 connecting pin 24 of the receiver to pin 34 of the transmitter. Data in bit serial format is transported from the transmitter to the receiver via pin 32, the data connector 12 and pin 22. The control connector 14 carries a control signal RTS/CTS asserted on pin 24 of the receiver. The control signal implements flow control from receiver to transmitter by indicating "flow on" (RTS/CTS active) or "flow off" (RTS/CTS inactive). Thus data transmission from left to right with flow control can be achieved.

If data transmission from right to left is required, device 20 can acts as transmitter and device 30 can act as receiver. Data in bit serial format is transported from the transmitter 20 to the receiver 30 via pin 26 the data connector 16 and then pin 36. A control connector 18 carries a control signal RTS/CTS asserted on pin 38 of the receiver to pin 28 of transmitter.

The production of RTS/CTS on the data connector by the receiver and the response to RTS/CTS in the transmitter are controlled by software.

The basic usage of RTS/CTS is conventional in that it means "flow on/off" when set active/inactive. The production of and response to RTS/CTS is not conventional and is controlled by a programmed processors in the receiver and transmitter.

Each transmitter has an output buffer for temporarily storing a packet of data before transmission, a microprocessor, a memory for storing the software used by the processor to carry out the invention, and an I/O controller for detecting a control signal from the receiver and for placing the packet data onto the data connector.

Each receiver will have an input buffer for temporarily storing incoming received packet data, a microprocessor, a memory for storing the software used by the processor to carry out the invention, and an I/O controller for asserting a control signal and for receiving packet data on the data connector.

Figure 2:
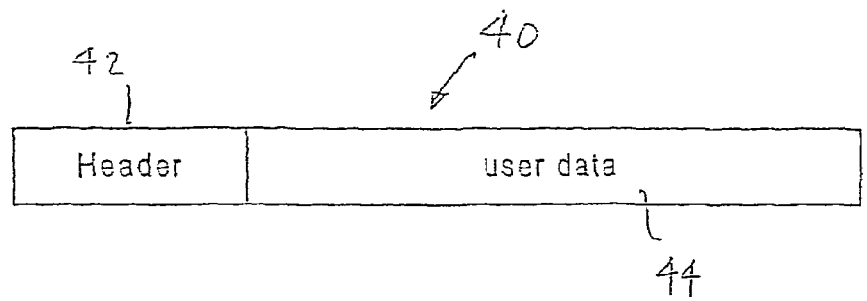
FIG. 2 shows the packet structure.

In the communication system 1 data packets 40 (as shown in FIG. 2) shall be transmitted over the interface. These data packets contain a packet header 42 with packet length information and a user data part 44 (e.g. Bluetooth HCI commands). The packet does not have a fixed size and is variable. However, there is an upper bound to the packet size. There is no structure in the packet which delimits the packet i.e. tells you "This is the header". The header doesn't need to have fixed size. The protocol only needs to know where to find the length information.

The packet contains complete bytes (i.e. multiple of 8 bits). "Fill bits" ('0's or random data) may be used to make the data packet 'byte aligned'.

As the packets are sent asynchronously it is important for packet synchronisation to be maintained.

The receiver counts received bits/bytes from the start of communication. The first data bytes the receiver receives then must be the start of a packet. The receiver knows length information about the packet. This is read from the packet header. From this information the receiver can calculate when the end of the packet is received. Consequently, the next bytes it receives must be the start of the next packet. Thus the transmitter and receiver remain synchronised at the packet level.

It is also important for the present invention, as will become more clear presently, for the transmitter to be aware of packet boundaries. The transmitter gets the packets from some higher software layer. This other software layer could frame the packet or put it in a certain location so that the transmitter always knows the packet boundaries (or at least the packet start). Alternatively the packet length could be looked up in the packet, in the same way that the receiver does it and the transmitted bytes counted.

PREFERRED EMBODIMENT

Figure 3:
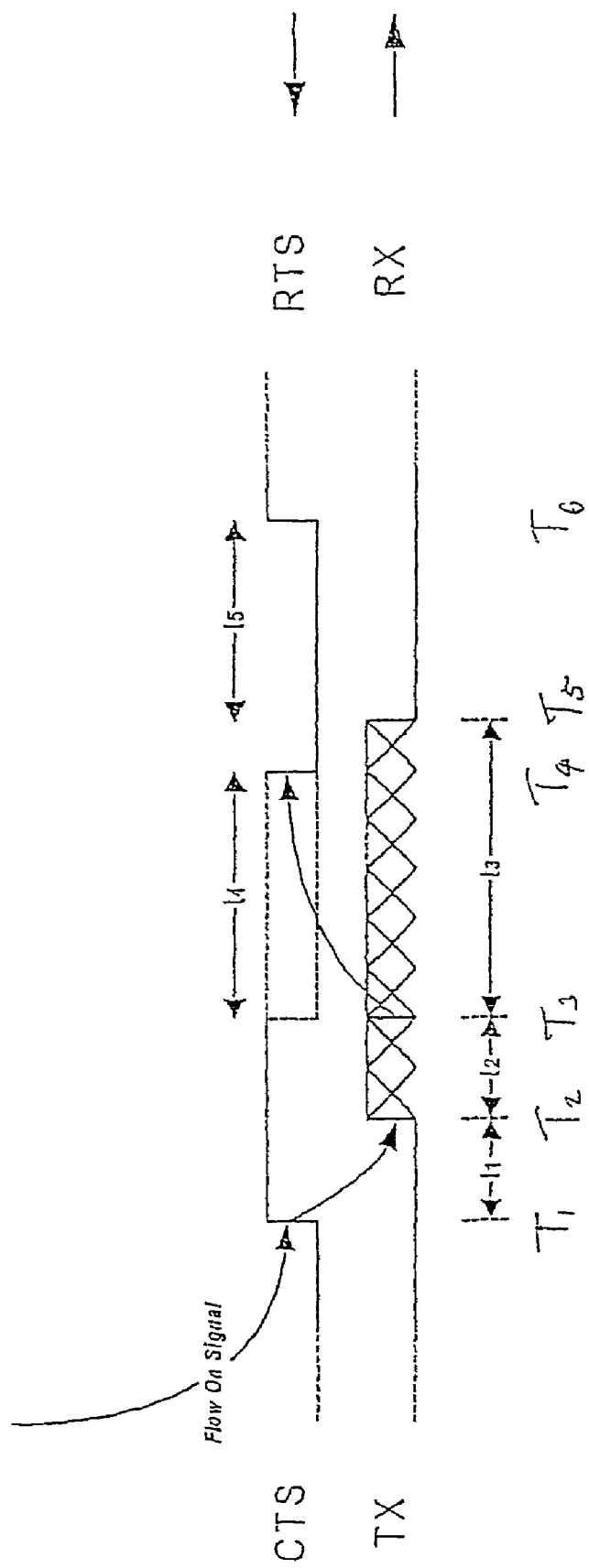
FIG. 3 shows the signal timing of the protocol.

The flow control between transmitter and receiver is handled packet wise. The detection of the rising edge of RTS/CTS allows the transmission of only one packet. The receiver de-asserts the RTS/CTS inactive once the packet header has been received. The transmitter is not allowed to transmit the next packet until detection of another rising edge of the RTS/CTS signal. The flow control handling is illustrated in FIG. 3. When the RTS/CTS goes inactive the transmitter completes transmission of the current packet. When RTS/CTS goes from inactive to active this signals the transmission of the next single packet.

Referring to FIG. 3, RTS/CTS goes active at time $T_1$. There is a latency $t_1$ for detection of the rising edge at the transmitter. The transmitter detects the rising edge at $T_2$. The transmitter takes $t_2$ to transmit the packet header and starts transmitting the rest of the packet at $T_3$ which takes $t_3$. The transmitter finishes transmitting the packet at $T_5$. There is a latency $t_4$ in the receiver detecting the transmitted packet header and this detection occurs at $T_4 = T_3 + t_4$, and RTS/CTS goes inactive.

The receiver puts RTS/CTS inactive after each and every packet header is received. The receiver then checks there is enough room for the next packet before putting RTS/CTS from inactive to active. The transmitter sends a single packet then waits for the RTS/CTS inactive-active transition (rising edge) before transmitting the next single packet. Thus transmission is packet wise and enabled by the CTS/RTS inactive-active transition.

The receiver is able to do the following:
a) know the maximum packet size N (this may be defined by the software).
b) reserve sufficient buffer memory for the maximum packet size N.
c) change RTS/CTS from inactive to active in response to the reservation (this indicates to the transmitter that the receiver can receive the whole of the next packet).
d) detect when a predetermined portion (e.g. header of size n) of the next packet has been received.
e) change RTS/CTS active to inactive in response to the detection.
f) go to a).

The detection could be done as follows. The receiver has a counter which maintains a count C of bits received. The counter is reset to zero at the start of a packet. When C=n, the detection is made. The size of the packet N' is read from the received header. The counter C is reset to zero after C=N' (the end of the packet).

The receiver reserves space for the maximum packet size as opposed to the actual packet size which may be read from the packet header. The receiver could allocate the buffer after evaluating the size from the received header but there could be some timing problems as buffer allocation takes some time. During this time data is being received continuously. So a certain buffer size N is preferably already allocated to store the data before the processor does the complete buffer allocation for the correct packet size N'.

The transmitter does the following:
a) knows the packet size N' (this can be communicated from a higher layer in the software or deduced from the header of the packet to be transmitted).
b) detect when RTS/CTS is made inactive.
c) determine when all of current packet has been transmitted.
d) stop transmitting in response to the determination.
e) detect when RTS/CTS is made active.
f) start transmission of a single packet in response to detection of RTS/CTS active.
g) go to a).

The determination could be done as follows. The transmitter has a counter which maintains a count C of bits/bytes transmitted. The counter is reset to zero at the start of a packet. The transmitter continues to transmit until C=N'-1, then stops transmitting.

Step b) is optional. Each falling edge (Active to Inactive) followed by a rising edge (Inactive to Active) of RTS/CTS may indicate that a packet should be transmitted or alternatively, each rising edge (Inactive to Active) of RTS/CTS may indicate that a packet should be transmitted. The CTS input of the transmitter causes an interrupt on each level change or, alternatively, only on the rising edge.

For an already started packet the RTS/CTS level change won't cause any effect (transmission is continued whatever happens as the receiver has indicated by a "flow on" level that it can receive the max. packet size).

EMBODIMENT 2

When the RTS/CTS goes low the transmitter completes transmission of the current packet. When RTS/CTS goes from inactive to active this signals the transmission of the next packet.

The receiver monitors the remaining memory and an alert is created when the remaining memory falls below some threshold and is reset when the available memory rises above the threshold. The receiver puts RTS/CTS inactive only when there is an alert AND after a packet header has been received.

That is, instead of changing RTS/CTS from active to inactive after every packet header is received as in the preferred embodiment, the transition only occurs when there is a risk of overflow. The transmitter would continuously send packet after packet while RTS/CTS remains active, and restarts continuously sending packet after packet when CTS/RTS goes inactive-active (i.e. inactive-active transition says 'restart data stream' as opposed to 'send one packet').

The receiver does the following:
1. detects when the available buffer memory for incoming data is below a threshold e.g. twice the maximum packet size N
2. detects when a predetermined portion (header of size n) of the next packet has been received
3. changes RTS/CTS active to inactive is response to both detections (this indicates to the transmitter that after the current packet, data flow should stop)
4. detects when the available buffer memory for incoming data is above the threshold
5. changes RTS/CTS inactive to active in response to the detection (this indicates to the transmitter that the data flow can recommence)
6. go to 1)

The detection at 2) could be done as follows. The receiver has a counter which maintains a count C of bits received. The counter is reset to zero at the start of a packet. When C=n, the detection is made. The size of the packet N' is read from the received header. The counter C is reset to zero after C=N' (the end of the packet).

The transmitter does the following:
1. knows the packet size N' (this can be communicated from a higher layer in the software or deduced from the header of the packet to be transmitted)
2. detects when RTS/CTS is made inactive
3. determines when all of current packet has been transmitted
4. stops transmitting in response to the determination
5. detects when RTS/CTS is made active
6. starts transmission of packets in response to detection of RTS/CTS active.
7. go to 1)

The determination could be done as follows. The transmitter has a counter which maintains a count C of bits/bytes transmitted. The counter is reset to zero at the start of a packet. The transmitter continues to transmit until C=N'-1, then stops transmitting.

For an already started packet the RTS/CTS level change won't cause any effect (transmission is continued whatever happens as the receiver has indicated by a "flow on" level that it can receive the max. packet size).

In the preceding embodiments, there is a step of detecting when a predetermined portion (header of size n) of the next packet has been received is used to put RTS/CTS inactive. Although an example of a predetermined portion is given (header) this is not critical.

Whilst endeavourng in the foregoing specification to draw attention to those features of the invention believed to be of particular importance it should be understood that the Applicant claims protection in respect of any patentable feature or combination of features hereinbefore referred to and/or shown in the drawings whether or not particular emphasis is placed thereon.

The invention claimed is:
1. A receiver comprising:
  a first detection component configured to detect that a memory has space sufficient to store a data packet; and
  a flow control signal component configured to provide a flow control signal on an output in response to said first detection component, wherein the first detection component is configured to detect for every packet that the memory has space sufficient to store a next data packet and the flow control signal component is configured to provide a first flow control signal once per packet.

2. A receiver as claimed in claim 1, wherein the flow control component is configured to provide the first flow control signal, to enable a transmitter to transmit the next data packet, in response to the first detection component.

3. A receiver as claimed in claim 1, additionally comprising a second detection component configured to detect when a first portion of a packet has been received, wherein the flow control signal component is configured to provide a second flow control signal, to stop transmission of the next data packet, in dependence upon the second detection component.

4. A receiver as claimed in claim 3, wherein the second flow control signal is configured to be provided independently of the availability of the memory and once per packet.

5. A receiver as claimed in claim 1, further comprising an output configured to issue flow control signals to a transmitter, an input configured to receive packet data from the transmitter, and the memory configured to store data received from the transmitter.

6. A method comprising:
   detecting in a receiver if the receiver has sufficient available memory to receive a data packet from a transmitter; and
   allowing transmission of the data packet from the transmitter to the receiver if there is sufficient available memory and preventing transmission of the data packet from the transmitter to the receiver if there is not sufficient available memory, wherein the detecting is performed for every packet to determine whether the receiver has sufficient space to store a next data packet and a first flow control signal is provided once per packet in response to the detecting.

7. A method as claimed in claim 6, further comprising providing the first flow control signal to enable the transmitter to transmit the next data packet, in response to detecting that the receiver has enough available memory.

8. A method as claimed in claim 6, comprising detecting when a first portion of a packet has been received and providing a second flow control signal, to stop transmission of the next data packet, dependent upon when a first portion of a packet has been detected.

9. A method as claimed in claim 8, wherein the second flow control signal is provided independently of the availability of the memory and once per packet.

10. A receiver comprising:
    an output configured to issue flow control signals to a transmitter;
    an input configured to receive packet data from the transmitter;
    a memory configured to store data received from the transmitter;
    a second detection component configured to detect when a first portion of a packet has been received;
    a flow control signal component configured to provide a flow control signal on the output in response to said second detection component; and
    a first detection component configured to detect that the memory has sufficient space to store the next packet to be received, wherein the flow control signal component is configured to provide a first flow control signal, to enable transmission of the next packet, in dependence upon the first detection component, wherein the first detection component is configured to detect for every packet that the memory has enough space to store a next packet to be received and the flow control signal component is configured to provide a first flow control signal once per packet.

11. A receiver comprising:
    an output configured to issue flow control signals to a transmitter;
    an input configured to receive packet data from the transmitter;
    a memory configured to store data received from the transmitter;
    a first detection means for detecting that the memory has enough space to store a data packet; and
    a flow control signal means for providing a flow control signal on the output in response to said first detection means, wherein the first detection means detects for every packet that the memory has enough space to store a next data packet and the flow control signal means provides a first flow control signal once per packet.

* * * * *